United States Patent [19]
Oliver

[11] Patent Number: 5,369,644
[45] Date of Patent: Nov. 29, 1994

[54] METHOD FOR TESTING A COMMUNICATION SYSTEM USING CANNED SPEECH

[75] Inventor: Douglas W. Oliver, Watauga, Tex.

[73] Assignee: Motorola, Inc., Schaumburg, Ill.

[21] Appl. No.: 807,329

[22] Filed: Dec. 16, 1991

[51] Int. Cl.⁵ .............................................. G08C 25/00
[52] U.S. Cl. ..................................... 371/20.4; 371/68.2
[58] Field of Search .................... 371/20.4, 22.1, 22.5, 371/22.6, 68.2, 20.1, 20.5, 3, 27

[56] References Cited

U.S. PATENT DOCUMENTS

| | | | |
|---|---|---|---|
| Re. 30,037 | 6/1979 | Bass | 371/20.5 |
| 4,744,083 | 5/1988 | O'Neil et al. | 371/22 |
| 4,831,624 | 5/1989 | McLaughlin et al. | 371/37 |
| 5,206,864 | 4/1993 | McConnell | 371/37.4 |

*Primary Examiner*—Hoa T. Nguyen
*Attorney, Agent, or Firm*—Raymond J. Warren

[57] ABSTRACT

A system is tested by providing a canned speed signal (a signal containing known speech) from a diagnostic controller to an encoder of the communication system. The canned signal is encoded forming an encoded canned speech signal. The encoded signal is transmitted to an where it is then decoded. The decoded signal is compared with the original canned speech signal in the diagnostic controller. A report of the comparison is then provided to a maintenance facility.

9 Claims, 2 Drawing Sheets

METHOD FOR TESTING A COMMUNICATION SYSTEM USING CANNED SPEECH

FIELD OF THE INVENTION

The present invention relates, in general, to communication systems and, more particularly, to a method for testing a communication system.

BACKGROUND OF THE INVENTION

A continuing problem in the field of communications is the ability to test the systems in order to improve their maintainability. In current testing, one or more of the elements of the communication system is replaced with a substitute testing device. While this permits portions of the system to be tested, the testing device eliminates an important element, such as the decoder, from the system. Since errors can result from the interaction of various elements of the system, the testing is incomplete unless all of the system elements are present during the testing.

SUMMARY OF THE INVENTION

A method is described for testing a communication system which utilizes a canned speech signal. The canned speech signal is provided from a diagnostic controller to an encoder of the communication system. The canned signal is encoded forming an encoded canned speech signal. The encoded signal is transmitted to a decoder. The decoded signal is then compared with the original canned speech signal in the diagnostic controller. A report of the comparison is then provided to a maintenance facility.

DETAILED DESCRIPTION OF THE DRAWINGS

Figure 1:
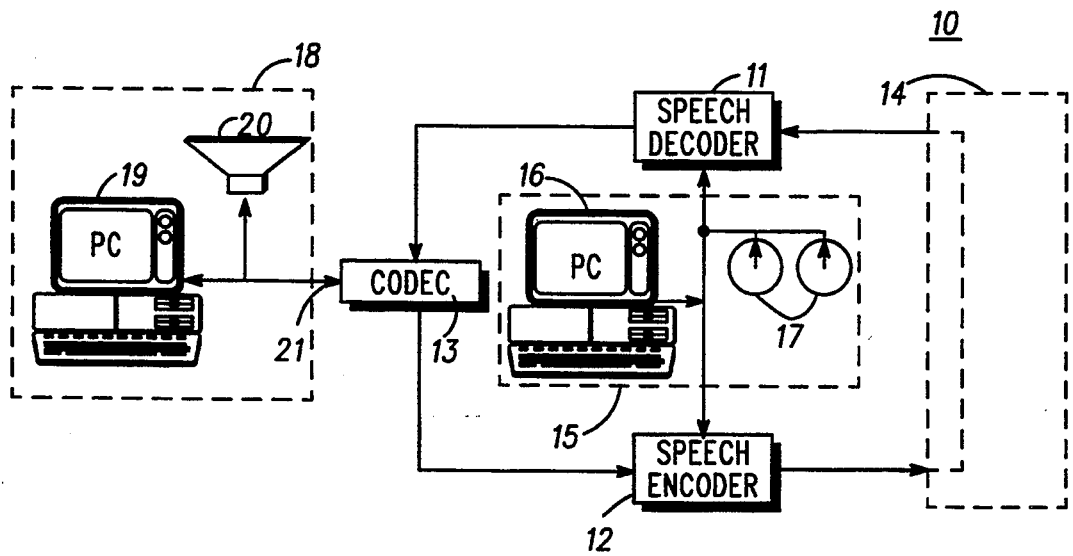
FIG. 1 is a block diagram of a portion of a communication system embodying the present invention.

Referring initially to the block diagram of FIG. 1, a portion of a communication system, generally designated 10, embodying the present invention is illustrated. System 10 consists primarily of a speech decoder 11, a speech encoder 12, and a CODEC (coder/decoder) 13. The rest of system 10 is designated by box 14. A diagnostic controller 15 is provided to implement and evaluate the test being performed. Controller 15 may consists of a computer 16 and/ or switches 17. Switches 17 are provided to set system 10 to a test mode and to designate the type of response (coded or audible).

In operation, a test signal, such as a canned speech signal, is generated by diagnostic controller 15 and transmitted to encoder 12. The canned speech signal is then encoded forming an encoded canned speech signal. In the present example, the encoded signal is transmitted to decoder 11 where it is decoded forming a decoded canned speech signal. The decoded signal is then compared with the original signal to determine if the encoder and decoder operated properly. In this particular embodiment, the comparison is performed by decoder 11.

The results of the comparison are then reported by transmitting the results from controller 15 to an off-site maintenance facility 18. This test result signal is transmitted from CODEC 13 over phone lines 21 to facility 18. In facility 18, the test results are stored in a computer 19 and or reported in an audible fashion through a speaker 20.

Figure 2:
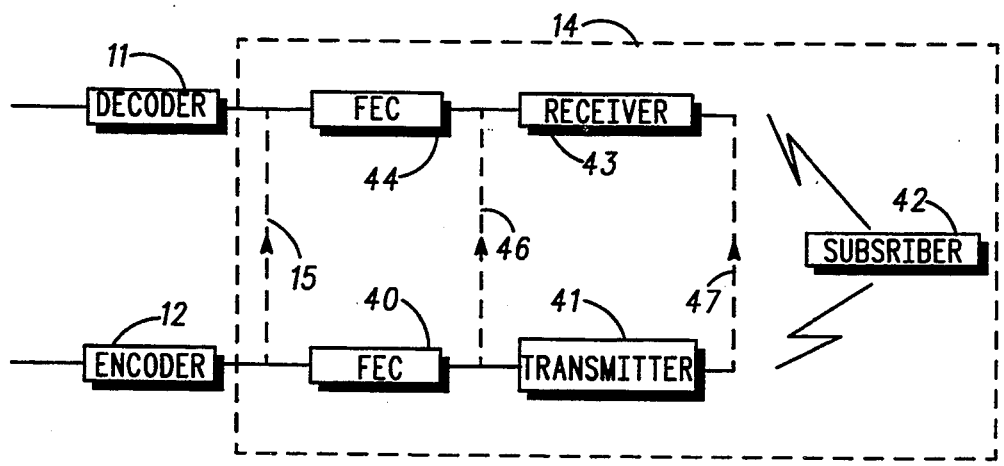
FIG. 2 is a more detailed block diagram of a portion of the communication system of FIG. 1.

In FIG. 2, a more detailed block diagram of box 14 system 10 of FIG. 1 is illustrated. Block 14 consists of forward error correcting devices (FECs) 40 and 44, a transmitter 41, a subscriber 42, and a receiver 43. The encoded signal is transmitted from encoder 12, through FEC 40 to transmitter 41. Here, the encoded signal is transmitted from transmitter 41 to subscriber 42 and returned from subscriber 42 to a receiver 43. Once received, the encoded signal is processed through FEC 44 before being sent on to decoder 11. As illustrated by dashed lines 45-47, system 10 may be shorted across these lines to eliminate any part of the devices in box 14 in order to test various combinations of devices 40-44.

Figure 3:
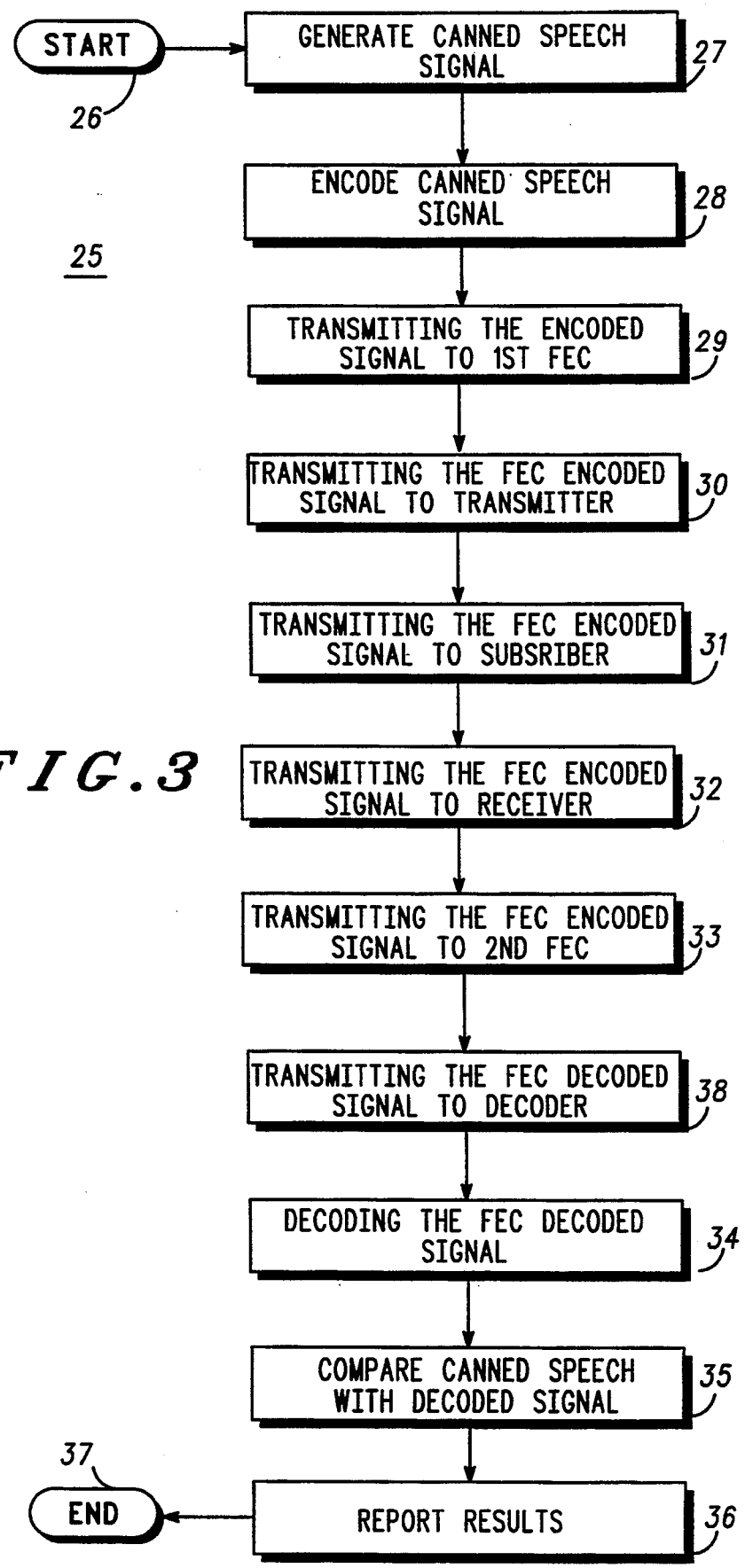
FIG. 3 is a block diagram of a flow chart illustrating the operation of the present invention.

Referring now to FIG. 3, a block diagram of a process, generally designated 25, representing the present invention is illustrated. Process 25 starts at block 26 and proceeds to step 27 where a canned speech signal is generated. The canned signal is then encoded, step 28, in encoder 12, forming an encoded canned speech signal.

The encoded signal is then transmitted to a first FEC 40 where it is forward error correction encoded, step 29. The encoded signal is then forwarded to transmitter 41, step 30, where it is transmitted to subscriber 42, step 31. Subscriber 42 then transmits the signal to a receiver 43, step 32.

The received signal is transmitted to FEC 44 where it is forward error correction decoded, step 33, before being forwarded to decoder 11. The FEC decoded signal is forwarded, step 38, to decoder 11 where it is decoded, step 34, forming a decoded canned speech signal. The decoded canned speech signal is then compared with the original canned speech signal, step 35. The results are then reported, step 36, and the process ends, step 37.

Therefore, a method has been shown which accomplishes the objective of testing the components of a communication system as they interact with the other communication system components.

Thus, it will be apparent to one skilled in the art that there has been provided in accordance with the invention, a data cell that fully satisfies the objects, aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

I claim:

1. A method for testing a communication system comprising the steps of:
   providing a canned speed signal from a diagnostic controller to an encoder of said communication system;
   encoding said canned speed signal in said encoder, forming an encoded canned speed signal;
   transmitting said encoded caned speed signal to a transmitter of said communication system;
   transmitting said encoded canned speech signal from said transmitter to a subscriber unit;

transmitting said encoded canned speech signal from said subscriber unit to a receiver of said communication system;

transmitting said encoded canned speech signal from said receiver to a decoder of said communication system;

decoding said encoded canned speech signal in said decoder forming a decoded canned speech signal;

comparing said decoded canned speech signal with said canned speech signal from said diagnostic controller; and reporting a result of said comparing step.

2. The method of claim 1 further comprising the step of processing said canned speech signal through a first forward error correction circuit of said communication system between said encoder and said transmitter.

3. The method of claim 1 further comprising the step of processing said canned speech signal through a second forward error correction circuit of said communication system between said receiver and said decoder.

4. The method of claim 1 wherein said step of reporting comprises the step of reporting an audio report to a user.

5. The method of claim 1 wherein said step of reporting comprises the step of reporting a visual report to a user.

6. A method for testing a communication system comprising the steps of:

providing a canned speech signal from a diagnostic controller to an encoder of said communication system;

encoding said canned speech signal in said encoder, forming an encoded canned speech signal;

transmitting said encoded canned speech signal to a first forward error correction circuit of said communication system where said encoded canned speech signal is forward error correction encoded, forming an FEC encoded signal;

transmitting said FEC encoded signal from said first forward error correction circuit to a transmitter of said communication system;

transmitting said FEC encoded signal from said transmitter to a subscriber unit;

transmitting said FEC encoded signal from said subscriber unit to a receiver of said communication system;

transmitting said FEC encoded signal from said receiver to a second forward error correction circuit where said FEC encoded signal is decoded forming an FEC decoded signal;

transmitting said FEC decoded signal from said second forward error correction circuit to said decoder;

decoding said FEC decoded signal in said decoder forming a decoded canned speech signal;

comparing said decoded canned speech signal with said canned speech signal from said diagnostic controller; and reporting a result of said comparing step.

7. The method of claim 6 wherein said step of reporting comprises the step of reporting an audio report to a user.

8. The method of claim 6 wherein said step of reporting comprises the step of reporting a visual report to a user.

9. A method for testing a communication system comprising the steps of:

providing a canned speech signal from a diagnostic controller to an encoder of said communication system;

encoding said canned speech signal in said encoder, forming an encoded canned speech signal;

transmitting said encoded canned speech signal to a first forward error correction circuit;

transmitting said encoded canned speech signal from said first forward error correction circuit to a second forward error correction circuit;

transmitting said encoded canned speech signal from said second forward error correction circuit to a decoder of said communication system;

decoding said encoded canned speech signal in said decoder forming a decoded canned speech signal;

comparing said decoded canned speech signal with said canned speech signal from said diagnostic controller; and reporting a result of said comparing step.

* * * * *

UNITED STATES PATENT AND TRADEMARK OFFICE
CERTIFICATE OF CORRECTION

PATENT NO. : 5,369,644
DATED : November 29, 1994
INVENTOR(S) : Douglas W. Oliver It is certified that error appears in the above-indentified patent and that said Letters Patent is hereby corrected as shown below:

Title page: Item [57], Column 2,

In the Abstract, line 6: "where it is then decoded" should be --decoder where it is then decoded--.

In Column 2, line 60: replace the word "speed" with the word --speech--.

In Column 2, line 63: replace the word "speed" with the word --speech--.

In Column 2, line 64: replace the word "speed" with the word --speech--.

In Column 2, line 65: replace the words "caned speed" with the words --canned speech--.

Signed and Sealed this

Thirty-first Day of January, 1995

*Attest:*

BRUCE LEHMAN

*Attesting Officer*    *Commissioner of Patents and Trademarks*